US012654801B2

(12) United States Patent　(10) Patent No.:　US 12,654,801 B2

Ko et al.　(45) Date of Patent:　Jun. 16, 2026

(54) TRICYCLE CAPABLE OF ROLLING

(71) Applicant: LI YUAN TRANSMISSION CO., LTD., Nantou County (TW)

(72) Inventors: Keng-Yu Ko, Nantou County (TW); Han Wei Tang, Pingtung County (TW)

(73) Assignee: LI YUAN TRANSMISSION CO., LTD., Nantou County (TW)

( * ) Notice: Subject to any disclaimer, the term of this patent is extended or adjusted under 35 U.S.C. 154(b) by 412 days.

(21) Appl. No.: 18/338,334

(22) Filed: Jun. 20, 2023

(65) Prior Publication Data

US 2024/0391552 A1　Nov. 28, 2024

(30) Foreign Application Priority Data

May 22, 2023　(TW) ................................. 112118886

(51) Int. Cl.
　*B62K 5/10*　(2013.01)
　*B62K 5/06*　(2006.01)
　*B62M 9/00*　(2006.01)

(52) U.S. Cl.
　CPC .................. *B62K 5/10* (2013.01); *B62K 5/06* (2013.01); *B62M 9/00* (2013.01)

(58) Field of Classification Search
　CPC .............. B62K 5/10; B62K 5/06; B62M 9/00
　USPC ....................................................... 280/261
　See application file for complete search history.

(56) References Cited

U.S. PATENT DOCUMENTS

| | | | |
|---|---|---|---|
| 3,880,449 A | 4/1975 | Wada | |
| 4,132,435 A * | 1/1979 | Wilson ..................... | B62K 5/10 |
| | | | 280/282 |
| 5,730,453 A * | 3/1998 | Owsen ..................... | B62K 5/02 |
| | | | 280/282 |

FOREIGN PATENT DOCUMENTS

| | | | | |
|---|---|---|---|---|
| CN | 201169366 Y | * | 12/2008 | |
| CN | 104554604 A | * | 4/2015 | ............. B62M 9/02 |
| DE | 4124926 A | | 1/1993 | |
| FR | 3122157 A | | 10/2022 | |
| TW | 319207 U | | 11/1997 | |
| WO | 2019162714 A | | 8/2019 | |

OTHER PUBLICATIONS

European Search Report, European Application No. 23180510.2, mailed Apr. 12, 2023 (7 pages).

* cited by examiner

*Primary Examiner* — Jacob D Knutson

(74) *Attorney, Agent, or Firm* — Leong C. Lei

(57) ABSTRACT

Provided is a tricycle including: a tricycle body having a first frame pivoted to a second frame, the first frame having a crank, at least one wheel shaft being rotatably arranged on the second frame; a first linkage assembly arranged on the first frame, the first linkage assembly having a first chain sleeving a first and a second chain wheels, the first chain wheel being coupled to the crank; a second linkage assembly arranged on the second frame, the second linkage assembly having a second chain sleeving a third and a fourth chain wheels, and the fourth chain wheel being coupled to the wheel shaft; and a transmission module having a first and a second universal joints connected to two ends of a telescopic cylinder respectively, the first universal joint being connected to the second chain wheel, and the second universal joint being connected to the third chain wheel.

4 Claims, 6 Drawing Sheets

TRICYCLE CAPABLE OF ROLLING

CROSS-REFERENCE TO RELATED APPLICATION

This application claims the benefit of Taiwan Patent Application No. 112118886, filed on 22 May 2023, which is hereby incorporated by reference for all purposes as if fully set forth herein.

BACKGROUND

Technical Field

The present disclosure mainly relates to a bicycle, and particularly relates to a tricycle capable of rolling; and a front frame and a rear frame of the tricycle capable of rolling can be pivoted to each other.

Related Art

A frame of an early tricycle was integrated, and a tricycle body was easily rolled when cornering, so it was easy for the tricycle to cause the accident of vehicle overturning when a roll angle was too large. To avoid this problem, existing manufacturers have divided the frame of the tricycle into a front frame and a rear frame pivoted to each other, thus the rear frame will not roll along with the front frame when the front frame rolls in cornering, and as a result, an accident of tricycle overturning is reduced. A conventional tricycle similar to the abovementioned known tricycle has been disclosed by Taiwan Patent No. 319207.

The known tricycle includes a front linkage assembly and two rear linkage assemblies; each of the front linkage assembly and the two rear linkage assemblies includes a chain sleeving a large fluted disc and a small fluted disc; the large fluted disc of the front linkage assembly is driven to rotate by two pedals; a rear shaft of the rear frame penetrates through the small fluted disc of the front linkage assembly and the large fluted discs of the two rear linkage assemblies; and the small fluted discs of the two rear linkage assemblies are connected to two rear wheels. Therefore, when the front frame is rolled, the large fluted disc of the front linkage assembly will be tilted together, but the rear frame is not tilted, so the rear shaft without tilting will limit the small fluted disc of the front linkage assembly to be incapable of being tilted synchronously along with the large fluted disc; as a result, if there is a requirement for power transmission when the front frame is tilted relative to the rear frame, it is easy to cause slipping of a chain of the front linkage assembly; and even if the power is not transmitted during tilting, the front linkage assembly is prone to the problem of component wear.

Therefore, it is necessary to provide a tricycle to solve the above problems.

SUMMARY

An objective of the present disclosure is to provide a tricycle capable of rolling. A whole front linkage assembly of the tricycle will tilt along with a front frame, and can transmit power to a rear linkage assembly in a tilting state without causing chain slippage.

Another objective of the present disclosure is to provide a tricycle capable of rolling, and it can reduce wear among power transmission components.

To achieve the above objectives, the present disclosure provides a tricycle capable of rolling, and the tricycle capable of rolling includes a tricycle body having a first frame and a second frame, the first frame having a first pivoting piece and a crank, the second frame having a second pivoting piece pivoted to the first pivoting piece, and at least one wheel shaft being rotatably arranged on the second frame; a first linkage assembly arranged on the first frame, the first linkage assembly having a first chain sleeving a first chain wheel and a second chain wheel, and the first chain wheel being coupled to the crank; a second linkage assembly arranged on the second frame, the second linkage assembly having a second chain sleeving a third chain wheel and a fourth chain wheel, and the fourth chain wheel being coupled to the wheel shaft; and a transmission module, having a first universal joint and a second universal joint connected to two ends of a telescopic cylinder respectively, the first universal joint being connected to the second chain wheel, and the second universal joint being connected to the third chain wheel.

In some embodiments, the first frame may have an extension bracket with one end extending to the second frame; the second frame may have a fixed bracket spaced from the extension bracket; the second chain wheel may be arranged adjacent to the extension bracket; and the third chain wheel may be arranged adjacent to the fixed bracket.

In some embodiments, the first linkage assembly may be coupled to the extension bracket by a bearing seat; an adapter may be able of coupling the bearing seat to an axis of the second chain wheel; and the first universal joint may be coupled to the adapter.

In some embodiments, the second linkage assembly may be coupled to the fixed bracket by a bearing seat; an adapter may be able of coupling the bearing seat to an axis of the third chain wheel; and the second universal joint may be coupled to the adapter.

In some embodiments, a pivoting frame may be capable of pivoting the second frame, and the wheel shaft may be rotatably arranged on the pivoting frame.

According to the present disclosure, the tricycle capable of rolling has the following characteristics: the whole first linkage assembly can be synchronously tilted along with the first frame, and the position and angle variation between the first linkage assembly and the second linkage assembly can be adjusted through the transmission module, so that even if the first frame is tilted relative to the second frame, power can be accurately transmitted to the second linkage assembly, the chain of the first linkage assembly or the second linkage assembly cannot slip off, moreover, the wear between components of the first linkage assembly and the second linkage assembly can be reduced. Therefore, the smooth operation of the first linkage assembly, the transmission module and the second linkage assembly can be ensured by the present disclosure, and the effects of improving driving safety and convenience, effectively prolonging the service life and the like are achieved.

DETAILED DESCRIPTION

Embodiments of the present disclosure will be described in detail with reference to drawings, and the accompanying drawings are mainly simplified schematic diagrams and only illustrate the basic structure of the present disclosure in a schematic way. Therefore, only elements related to the present disclosure are marked in these drawings, and the displayed elements are not drawn according to the number, shape, size ratio, etc. for implementation; the specifications and dimensions in actual implementation will be actually an optional design; and the layout of the elements may be more complicated.

The following description of various embodiments refers to the accompanying drawings to illustrate practical specific embodiments of the present disclosure. According to the present disclosure, a Y direction is defined as forward and backward, an X direction is defined as left and right, and a Z direction is defined as up (top) and down (bottom) according to the driving direction of a tricycle; in addition, the directionality such as "inside", "outside" and "side" or their approximate terms mentioned in the whole text of the present disclosure mainly refer to the directions in the accompanying drawings, and each directionality or its approximate terms are only used for assisting in explaining and understanding various embodiments of the present disclosure, rather than limiting the present disclosure. In addition, in the specification, unless explicitly described to the contrary, the word "comprising" will be understood to mean including the elements, but not excluding any other element.

Figure 1:
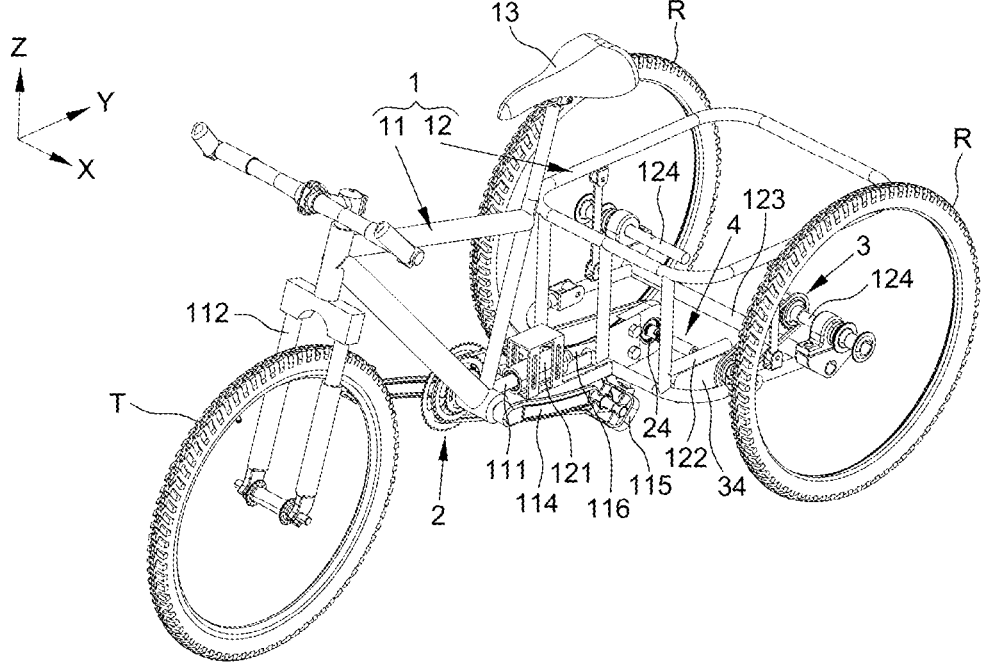
FIG. 1 is a three-dimensional diagram of an embodiment of the present disclosure.

FIG. 1 shows a preferred embodiment of a tricycle capable of rolling according to the present disclosure. The tricycle capable of rolling includes a tricycle body 1, a first linkage assembly 2, a second linkage assembly 3 and a transmission module 4; the first linkage assembly 2 and the second linkage assembly 3 are arranged on the tricycle body 1; and the transmission module 4 is positioned between first linkage assembly 2 and the second linkage assembly 3.

The tricycle body 1 has a first frame 11 and a second frame 12; the first frame 11 has a first pivoting piece 111; the second frame 12 has a second pivoting piece 121; the second pivoting piece 121 is pivoted to the first pivoting piece 111; and the first pivoting piece 111 and the second pivoting piece 121 can implement opposite anticlockwise or clockwise pivoting, and thus the first frame 11 can tilt leftwards or rightwards relative to the second frame 12.

According to this embodiment, a front frame may be selected as the first frame 11, and a rear frame may be selected as the second frame 12 for description. In this embodiment, the first pivoting piece 111 may be approximately positioned at a rear end of a central position of the first frame 11, and the first pivoting piece 111 may be a shaft lever; the second pivoting piece 121 may be approximately positioned at a front end of a central position of the second frame 12, and the second pivoting piece 121 may be a shaft sleeve; and the shaft lever is rotatably inserted into the shaft sleeve. The present disclosure is not limited by this configuration, namely, in other embodiments, the shaft lever and the shaft sleeve may be arranged oppositely, or pivoting structures in other forms may be provided.

In addition, in this embodiment, a tricycle capable of rolling and having a front wheel T and two rear wheels R is taken as an example for illustrating in the following, but it is not limited to it; and in other embodiments, a tricycle capable of rolling and having two front wheels T and a rear wheel R may be adopted.

Figure 2:
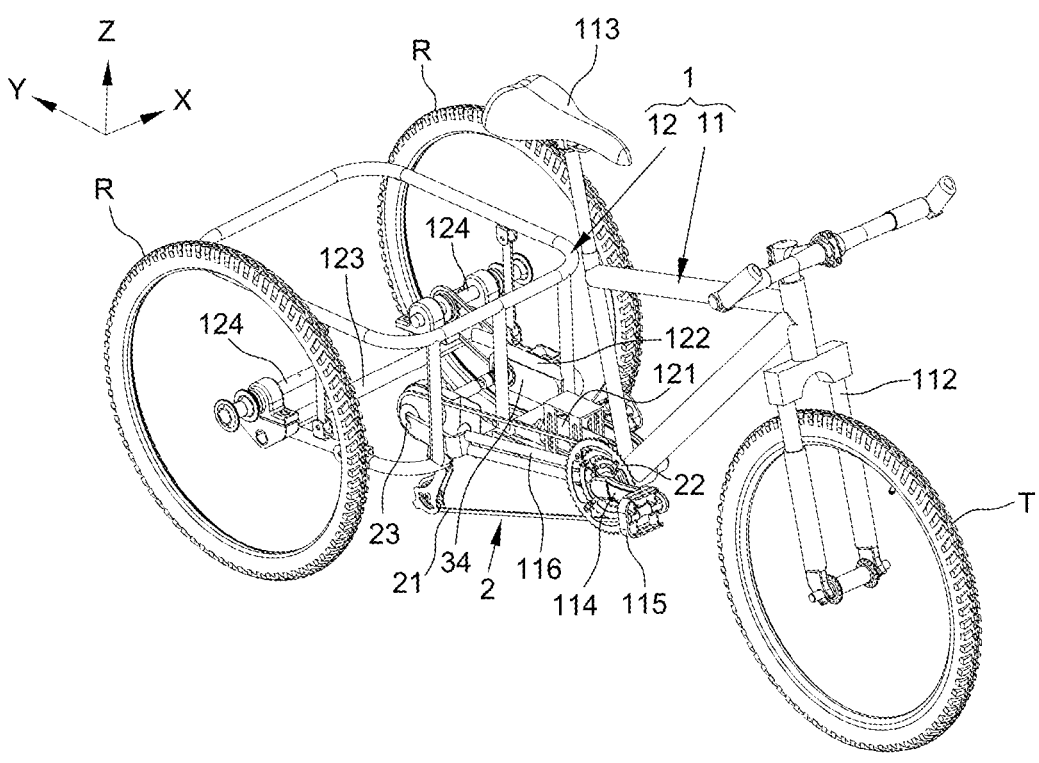
FIG. 2 is a three-dimensional diagram in another view angle of an embodiment of the present disclosure.

As shown in FIG. 1 and FIG. 2, the first frame 11 may further have a front fork 112 for mounting the front wheel T, a seat cushion 113 for a driver to sit on, two cranks 114 respectively connected to pedals 115, and an extension bracket 116 with one end extending backwards into the second frame 12. The second frame 12 includes a fixed bracket 122 spaced from the extension bracket 116, and a transmission module 4 (described later) is arranged between the fixed bracket 122 and the extension bracket 116. In addition, a pivoting frame 123 is pivoted to a main body of the second frame 12, and at least one wheel shaft 124 is rotatably arranged on the pivoting frame 123. In this embodiment, two opposite wheel shafts 124 are arranged and used for mounting the two rear wheels R respectively, and the two rear wheels R can synchronously jump with the pivoting frame 123 pivoted relative to the main body of the second frame 12 when a road surface is uneven. A differential mechanism (not shown) may be further arranged between the two opposite wheel shafts 124. The shapes and detail structures of the first frame 11 and the second frame 12 may be adjusted and changed according to the using demand, and are understandable for persons having ordinary knowledge in the art, so no more details are described one by one; and it is not limited by the form described in the drawings of the embodiment.

Figure 3:
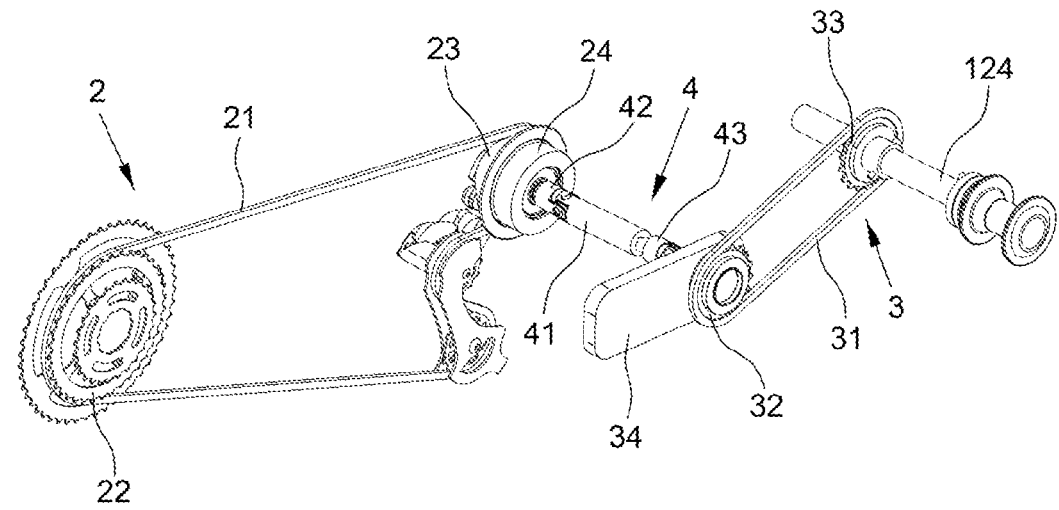
FIG. 3 is a three-dimensional diagram of a first linkage assembly, a second linkage assembly and a transmission module according to an embodiment of the present disclosure.

As shown in FIG. 2 and FIG. 3, the first linkage assembly 2 is arranged on the first frame 11, and includes a first chain 21 sleeving a first chain wheel 22 and a second chain wheel 23. The first chain wheel 22 is coupled to the cranks 114 so as to drive the first chain wheel 22 to rotate by the cranks 114; and the first chain wheel 22 may be a common chainwheel. The second chain wheel 23 may be arranged adjacent to the extension bracket 116. In this embodiment, as shown in FIG. 1 and FIG. 4, a bearing seat 24 may be selectively coupled to the extension bracket 116, and an adapter 25 is capable of coupling the bearing seat 24 to an axis of the second chain wheel 23, so that the second chain wheel 23 can be rotatably arranged adjacent to the extension bracket 116 (as shown in FIG. 2).

Figure 4:
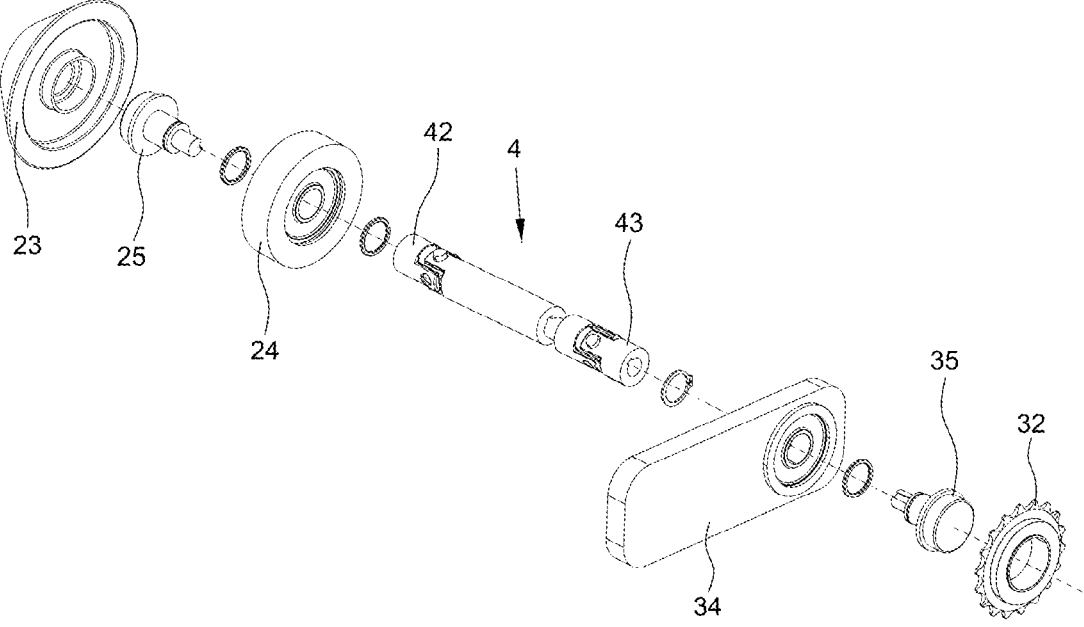
FIG. 4 is a three-dimensional detail diagram of local components in FIG. 3.

As shown in FIG. 1 and FIG. 3, the second linkage assembly 3 is arranged on the second frame 12, and includes a second chain 31 sleeving a third chain wheel 32 and a fourth chain wheel 33; the third chain wheel 32 is arranged adjacent to the fixed bracket 122; as shown in FIG. 1 and FIG. 4, in this embodiment, a bearing seat 34 may be selectively coupled to the fixed bracket 122, and an adapter 35 is capable of coupling the bearing seat 34 to an axis of the third chain wheel 32, so that the third chain wheel 32 can be rotatably arranged adjacent to the fixed bracket 122. As shown in FIG. 1 and FIG. 3, the fourth chain wheel 33 may be coupled to one wheel shaft 124, so that the rear wheels R may rotate along with the fourth chain wheel 33 through the wheel shaft 124.

As shown in FIG. 1 and FIG. 3, the transmission module 4 has a telescopic cylinder 41, and the telescopic cylinder 41 can be, but not limited to, for example, a hydraulic cylinder or a pneumatic cylinder. The transmission module 4 has a first universal joint 42 and a second universal joint 43, and the first universal joint 42 and the second universal joint 43 are connected to two ends of the telescopic cylinder 41 respectively. The first universal joint 42 is connected to the second chain wheel 23; the second universal joint 43 is connected to the third chain wheel 32; the first universal joint 42 and the second universal joint 43 are adapted to changes of an included angle between two axial lines of the second chain wheel 23 and the third chain wheel 32, moreover, constant-angular-speed transmission between the second chain wheel 23 and the third chain wheel 32 is also achieved, and meanwhile, changes of the distance between the second chain wheel 23 and the third chain wheel 32 are automatically adjusted through the telescopic cylinder 41.

In this embodiment, as shown in FIG. 4, the first universal joint 42 may be coupled to the adapter 25 so as to be indirectly connected to the second chain wheel 23 through the adapter 25; and the second universal joint 43 may be coupled to an adapter 35 so as to be indirectly connected to the third chain wheel 32 through the adapter 35. According to the present disclosure, the coupling mode of the universal joints 42 and 43 and the adapters 25 and 35 is not limited, for example, the coupling modes may be close-fitting coupling or screw locking or sleeved coupling or key block and key groove matching for synchronous rotation.

As shown in FIG. 1 and FIG. 3, according to the above-mentioned structure, the tricycle capable of rolling according to this embodiment may transmit the power to the second chain wheel 23 through the first linkage assembly 2, and the transmission module 4 is driven to rotate so as to transmit the power to the third chain wheel 32, and then the rear wheels R are driven to rotate through the second linkage assembly 3.

Figure 5:
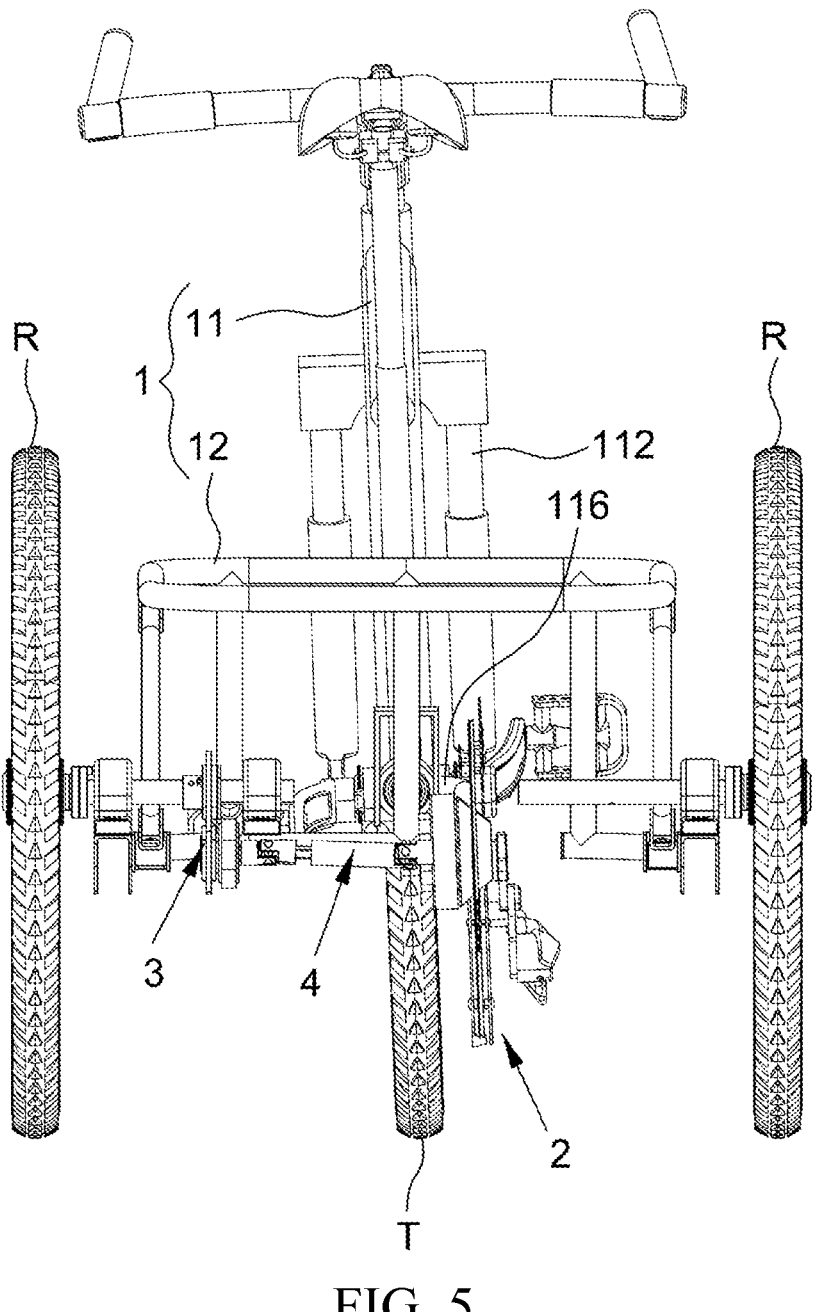
FIG. 5 is a rear view of non-rolling according to an embodiment of the present disclosure, and omits a pivoting frame of a second frame.

As shown in FIG. 3 and FIG. 5, the first frame 11 of the tricycle capable of rolling is not tilted leftwards or rightwards relative to the second frame 12; the telescopic cylinder 41 of the transmission module 4 can be in a preset stretching degree; and the first universal joint 42 and the second universal joint 43 are both in a linear shape and do not tilt relative to the second chain wheel 23 or the third chain wheel 32.

Figure 6:
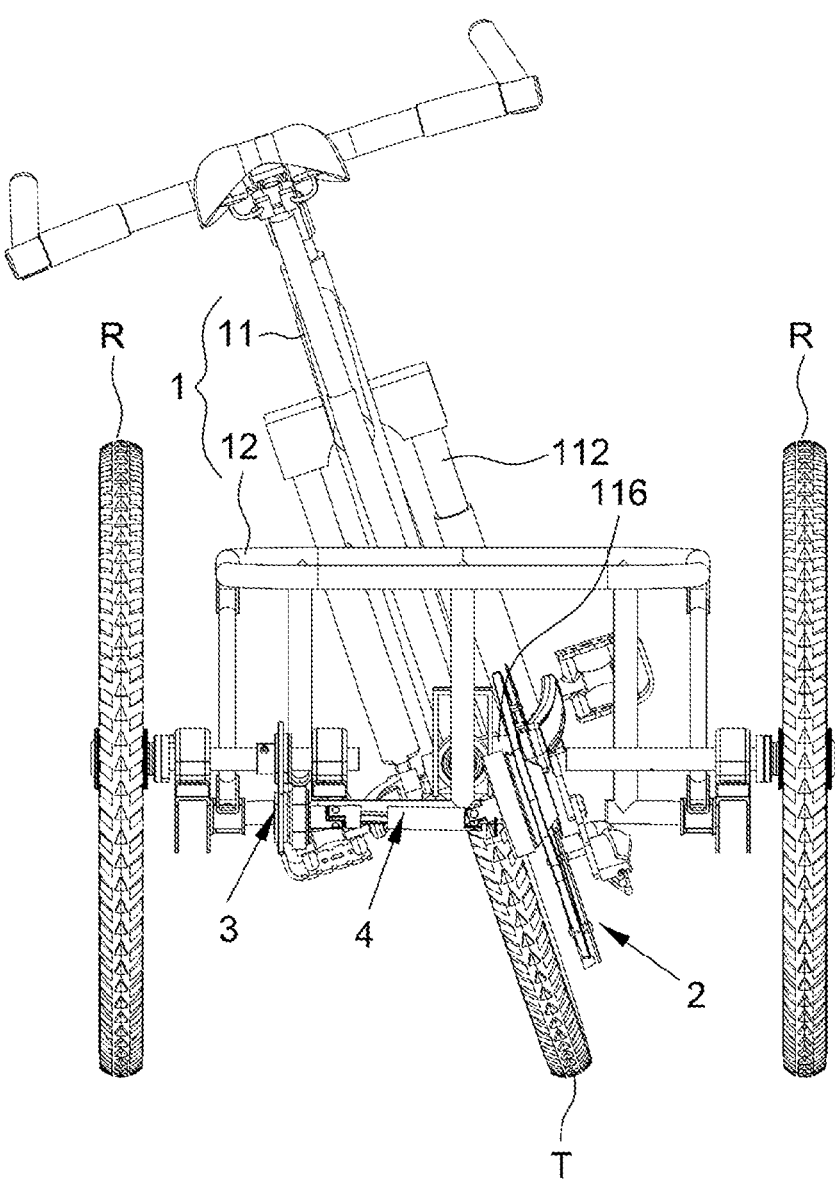
FIG. 6 is a rear view of leftward tilting according to an embodiment of the present disclosure, and omits a pivoting frame of a second frame.

As shown in FIG. 3 and FIG. 6, when the first frame 11 tilts leftwards relative to the second frame 12, the second chain wheel 23 will relatively get away from the third chain wheel 32 along with leftward tilting of the first frame 11, so the stretching degree of the telescopic cylinder 41 will be increased, and the first universal joint 42 connected to the second chain wheel 23 will be anticlockwise pivoted relative to the telescopic cylinder 41 to be in a bent shape due to the position changes of the second chain wheel 23; and the second universal joint 43 connected to the third chain wheel 32 will still be in a linear shape and does not tilt.

Figure 7:
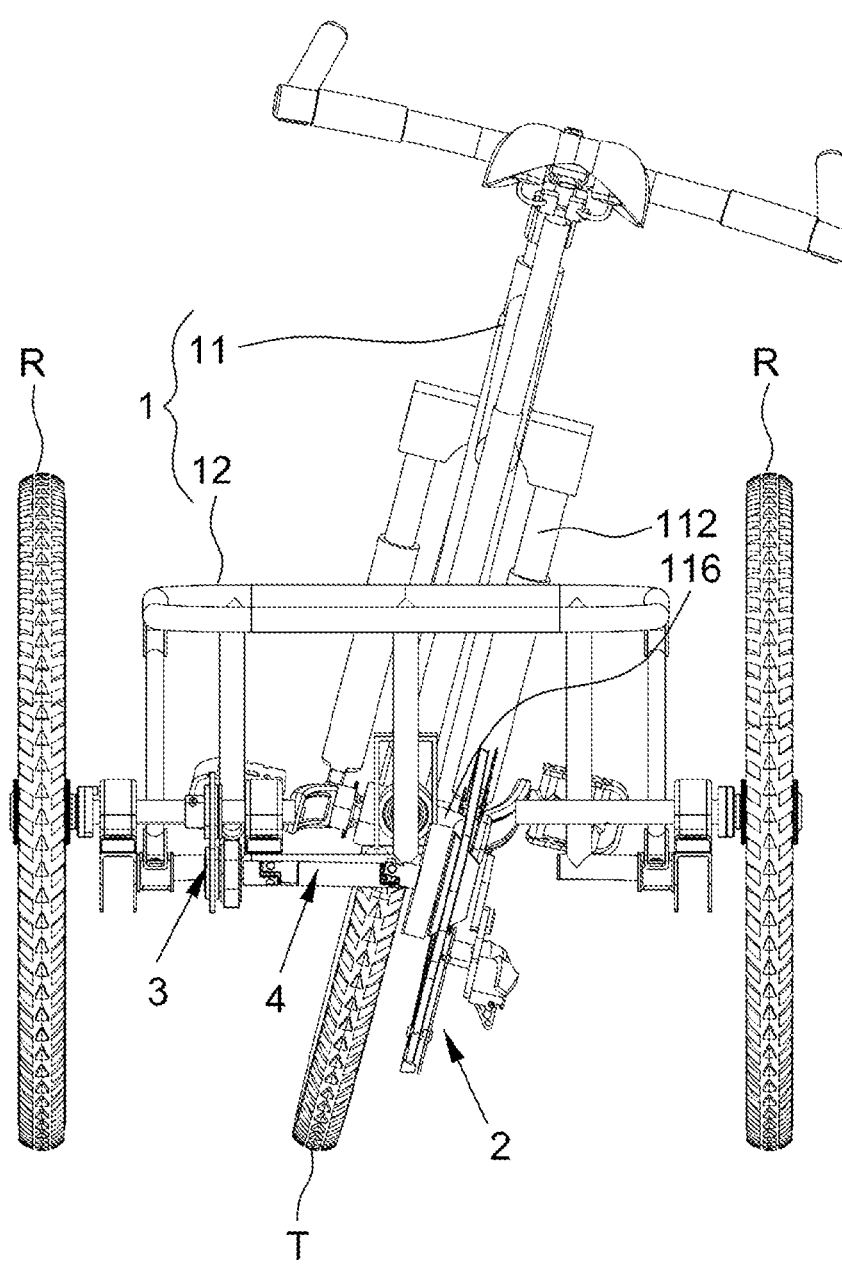
FIG. 7 is a rear view of rightward tilting according to an embodiment of the present disclosure, and omits a pivoting frame a second frame.

As shown in FIG. 3 and FIG. 7, when the first frame 11 tilts rightwards relative to the second frame 12, the second chain wheel 23 will relatively get close to the third chain wheel 32 along with rightward tilting of the first frame 11, so the stretching degree of the telescopic cylinder 41 will be decreased, and the first universal joint 42 connected to the second chain wheel 23 will be clockwise pivoted relative to the telescopic cylinder 41 to be in a bent shape due to the position changes of the second chain wheel 23; and the second universal joint 43 connected to the third chain wheel 32 will still be in a linear shape and does not tilt.

Therefore, according to the tricycle capable of rolling in this embodiment, no matter whether the first frame 11 tilts leftwards or rightwards relative to the second frame 12, the whole first linkage assembly 2 will be synchronously tilted along with the first frame 11, and therefore even if the power is input from the first chain wheel 22 during tilting, the first chain 21 will accurately transmit the power to the second chain wheel 23, and a phenomenon of the first chain 21 slipping is greatly prevented. In addition, by means of the first universal joint 42 and the second universal joint 43, the up and down displacement of the two ends of the telescopic cylinder 41 may be effectively reduced, moreover, the wear rate of the first universal joint 42 and the second universal joint 43 will be reduced, and thus the effect of prolonging the service life of the transmission module 4 will be achieved.

Remarkably, the tricycle capable of rolling according to the present disclosure may be a manual treading driving tricycle or electric driving tricycle; for example, a forward-wheel-drive tricycle with the front wheel driven by a hub motor or a backward-wheel-drive tricycle with the rear wheels driven by an electric motor may be selected, or vice versa, and the present disclosure does not limit it; and moreover, the corresponding structure may be adjusted and changed as required by those with ordinary knowledge in the art.

As described above, the whole first linkage assembly of the tricycle capable of rolling according to the present disclosure can be synchronously tilted along with the first frame, and the position and angle variation between the first linkage assembly and the second linkage assembly can be adjusted through the transmission module, so that even if the first frame is tilted relative to the second frame, power can be accurately transmitted to the second linkage assembly, the chain of the first linkage assembly or the second linkage assembly cannot slip off, and moreover, the wear between components of the first linkage assembly and the second linkage assembly can be reduced. Therefore, the smooth operation of the first linkage assembly, the transmission module and the second linkage assembly can be ensured by the present disclosure, and the effects of improving driving safety and convenience, effectively prolonging the service life and the like are achieved.

The disclosed embodiments are only illustrative explanations of the principles, characteristics, and efficacy of the present disclosure, and are not intended to limit the scope of the present disclosure. Any person familiar with this art may modify and change the aforementioned embodiments without violating the spirit and scope of the present disclosure. Any equivalent changes and modifications made by applying the disclosed content of the present disclosure shall still be covered by the scope of the following patent applications.

What is claimed is:

1. A tricycle capable of rolling, comprising:
a tricycle body having a first frame and a second frame, the first frame having a first pivoting piece and a crank, the second frame having a second pivoting piece pivoted to the first pivoting piece, and at least one wheel shaft being rotatably arranged on the second frame;
a first linkage assembly arranged on the first frame, the first linkage assembly having a first chain sleeving a first chain wheel and a second chain wheel, and the first chain wheel being coupled to the crank;
a second linkage assembly arranged on the second frame, the second linkage assembly having a second chain sleeving a third chain wheel and a fourth chain wheel, and the fourth chain wheel being coupled to the wheel shaft; and
a transmission module, having a first universal joint and a second universal joint connected to two ends of a telescopic cylinder respectively, the first universal joint being connected to the second chain wheel, and the second universal joint being connected to the third chain wheel;

wherein a pivoting frame is capable of pivoting the second frame; and the wheel shaft is rotatably arranged on the pivoting frame.

2. The tricycle capable of rolling according to claim 1, wherein the first frame has an extension bracket with one end extending to the second frame; the second frame has a fixed bracket spaced from the extension bracket; the second chain wheel is arranged adjacent to the extension bracket; and the third chain wheel is arranged adjacent to the fixed bracket.

3. The tricycle capable of rolling according to claim 2, wherein the first linkage assembly is coupled to the extension bracket by a bearing seat; an adapter is capable of coupling the bearing seat to an axis of the second chain wheel; and the first universal joint is coupled to the adapter.

4. The tricycle capable of rolling according to claim 2, wherein the second linkage assembly is coupled to the fixed bracket by a bearing seat; an adapter is capable of coupling the bearing seat to an axis of the third chain wheel; and the second universal joint is coupled to the adapter.

* * * * *